(12) United States Patent
Ueno

(10) Patent No.: US 10,560,650 B2
(45) Date of Patent: Feb. 11, 2020

(54) PHOTOELECTRIC CONVERSION DEVICE

(71) Applicant: CANON KABUSHIKI KAISHA, Tokyo (JP)

(72) Inventor: Isamu Ueno, Hadano (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 15/953,009

(22) Filed: Apr. 13, 2018

(65) Prior Publication Data

US 2018/0309945 A1 Oct. 25, 2018

(30) Foreign Application Priority Data

Apr. 24, 2017 (JP) ................. 2017-085340

(51) Int. Cl.
*H04N 5/359* (2011.01)
*H04N 5/232* (2006.01)
*H04N 5/3745* (2011.01)
*H04N 5/378* (2011.01)
*H04N 5/365* (2011.01)
*H04N 5/357* (2011.01)

(52) U.S. Cl.
CPC ....... *H04N 5/3597* (2013.01); *H04N 5/23212* (2013.01); *H04N 5/3575* (2013.01); *H04N 5/3658* (2013.01); *H04N 5/378* (2013.01); *H04N 5/37457* (2013.01)

(58) Field of Classification Search
CPC ............. H04N 5/23212; H04N 5/3597; H04N 5/3658; H04N 5/3575; H04N 5/378; H04N 5/375457
See application file for complete search history.

(56) References Cited

U.S. PATENT DOCUMENTS

| 6,064,431 | A  | 5/2000  | Ueno         |
| 6,188,094 | B1 | 2/2001  | Kochi et al. |
| 6,342,920 | B2 | 1/2002  | Ueno         |
| 6,605,850 | B1 | 8/2003  | Kochi et al. |
| 6,670,990 | B1 | 12/2003 | Kochi et al. |
| 6,946,637 | B2 | 9/2005  | Kochi et al. |

(Continued)

FOREIGN PATENT DOCUMENTS

JP 2008-85994 A 4/2008

*Primary Examiner* — Lin Ye
*Assistant Examiner* — John H Morehead, III
(74) *Attorney, Agent, or Firm* — Venable LLP

(57) ABSTRACT

Provided is a photoelectric conversion device including: a pixel array including pixels arranged to form columns; and a readout unit including column readout circuits provided corresponding to the columns, each of the column readout circuits being configured to read out signals from the pixels in a corresponding column. Each of the column readout circuits includes a holding unit configured to hold a reference voltage supplied from a reference voltage line, an amplifier unit configured to amplify a signal output from one of the pixels based on the reference voltage held in the holding unit, and a switch unit configured to electrically disconnect the reference voltage line from the holding unit when the amplifier unit amplifies the signal. The holding unit of a first column readout circuit and the holding unit of a second column readout circuit are electrically connected to each other by a path other than the switch unit.

8 Claims, 6 Drawing Sheets

(56) References Cited

U.S. PATENT DOCUMENTS

| | | | |
|---|---|---|---|
| 7,110,030 B1 | 9/2006 | Kochi et al. | |
| 7,466,003 B2 | 12/2008 | Ueno et al. | |
| 7,538,810 B2 | 5/2009 | Koizumi et al. | |
| 7,755,688 B2 * | 7/2010 | Hatano | H04N 5/3742 348/241 |
| 7,872,286 B2 | 1/2011 | Okita et al. | |
| 7,961,237 B2 | 6/2011 | Hatano et al. | |
| 8,089,545 B2 | 1/2012 | Koizumi et al. | |
| 8,421,894 B2 | 4/2013 | Koizumi et al. | |
| 8,883,526 B2 | 11/2014 | Okita et al. | |
| 2005/0259167 A1 * | 11/2005 | Inoue | H04N 5/343 348/300 |
| 2007/0258000 A1 * | 11/2007 | Kondo | H04N 5/217 348/308 |
| 2008/0055445 A1 * | 3/2008 | Hatano | H04N 5/365 348/302 |
| 2012/0288150 A1 * | 11/2012 | Kido | G06K 9/2018 382/103 |
| 2013/0181118 A1 | 7/2013 | Koizumi et al. | |
| 2016/0057372 A1 * | 2/2016 | Iwane | H04N 5/37457 348/300 |
| 2016/0150176 A1 * | 5/2016 | Hiyama | H04N 5/37457 348/301 |
| 2016/0234451 A1 * | 8/2016 | Otaka | H04N 5/378 |
| 2017/0078603 A1 * | 3/2017 | Yamasaki | H04N 5/378 |

\* cited by examiner

PHOTOELECTRIC CONVERSION DEVICE

BACKGROUND OF THE INVENTION

Field of the Invention

The present invention relates to a photoelectric conversion device.

Description of the Related Art

Japanese Patent Application Laid-Open No. 2008-85994 discloses a photoelectric conversion device having a plurality of pixels arranged in a row direction and a column direction and readout circuits provided on a column basis. The readout circuit is provided with a holding unit that holds a reference voltage input externally and an operational amplifier unit to which the reference voltage is input. Further, the readout circuit has a switch unit that electrically disconnects the holding unit from the outside when the operational amplifier unit amplifies a signal output from the pixel. Japanese Patent Application Laid-Open No. 2008-85994 discloses that, since temporal variation of the reference voltage can be suppressed, it is possible to reduce random noise that appears as horizontal stripes on an image due to disturbance noise of the reference voltage.

When holding units are provided on a column basis as illustrated in FIGS. 6A and 6B of Japanese Patent Application Laid-Open No. 2008-85994, however, the presence of leakage in a peripheral circuit of a hold capacitor forming the holding unit may cause the reference voltage held in the hold capacitor to vary during a readout period. Readout in a state where the reference voltages are different among the plurality of columns causes vertical stripe noise to occur in an acquired image.

SUMMARY OF THE INVENTION

A photoelectric conversion device according to one aspect of the present invention includes: a pixel array including a plurality of pixels which are arranged to form a plurality of columns; and a readout unit including a plurality of column readout circuits that are provided corresponding to the plurality of columns of the pixel array, each of the plurality of column readout circuits being configured to read out signals from the pixels in a corresponding column. Each of the plurality of column readout circuits includes a holding unit configured to hold a reference voltage supplied from a reference voltage line, an amplifier unit configured to amplify a signal output from one of the plurality of pixels based on the reference voltage held in the holding unit, and a switch unit configured to electrically disconnect the reference voltage line from the holding unit when the amplifier unit amplifies the signal output from the pixels. The holding unit of a first column readout circuit and the holding unit of a second column readout circuit different from the first column readout circuit are electrically connected to each other by a path other than the switch unit.

Further features of the present invention will become apparent from the following description of exemplary embodiments with reference to the attached drawings.

DESCRIPTION OF THE EMBODIMENTS

Preferred Embodiments of the Present Invention will now be described in detail in accordance with the accompanying drawings.

First Embodiment

Figure 1:
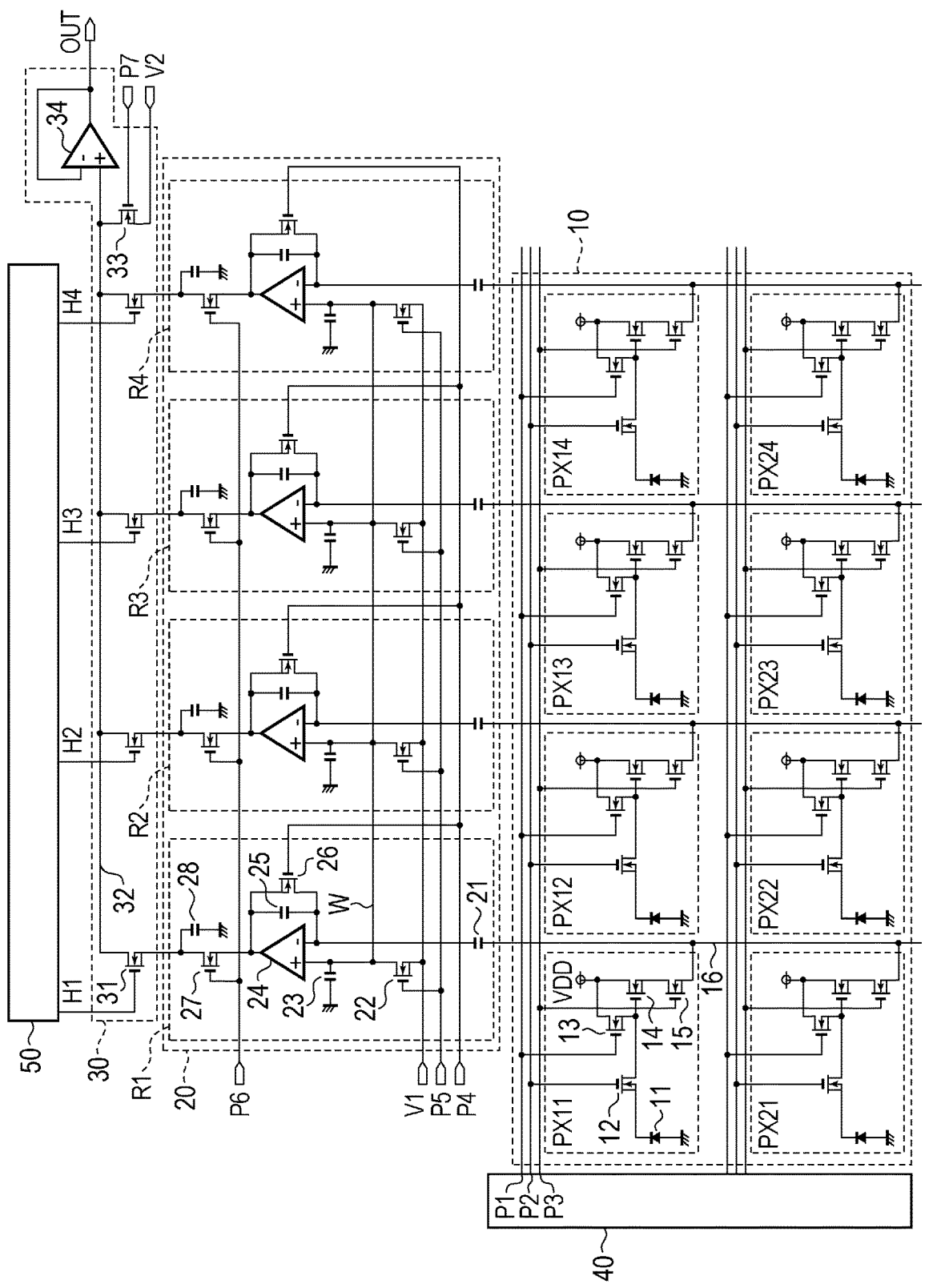
FIG. 1 is a circuit configuration diagram of a photoelectric conversion device according to a first embodiment of the present invention.

FIG. 1 is a circuit configuration diagram of a photoelectric conversion device according to a first embodiment of the present invention. The photoelectric conversion device has a pixel array 10, a readout unit 20, a horizontal transfer circuit 30, a vertical scanning circuit 40, and a horizontal scanning circuit 50.

The pixel array 10 includes a plurality of pixels PX arranged to form a plurality of rows and a plurality of columns. While FIG. 1 illustrates the pixel array 10 in which the pixels PX are arranged in a matrix of two rows by four columns for simplified illustration, the number of rows and columns is not limited in particular. Further, in FIG. 1, for the purpose of illustration, the row number is denoted as m, the column number is denoted as n, and references of PXmn are provided to respective pixels (m and n are natural numbers). For example, the pixel PX located on the first row and the second column is denoted as PX12.

The circuit configuration of each pixel PX will be descried. The pixel PX has a photoelectric conversion element 11, a transfer transistor 12, a reset transistor 13, an amplification transistor 14, and a selection transistor 15. The photoelectric conversion element 11 is a photodiode, for example. The anode of the photoelectric conversion element 11 is grounded, and the cathode of the photoelectric conversion element 11 is connected to the source of the transfer transistor 12. The drain of the transfer transistor 12 is connected to the source of the reset transistor 13 and the gate of the amplification transistor 14. The connection node of the drain of the transfer transistor 12, the source of the reset transistor 13, and the gate of the amplification transistor 14 forms a floating diffusion region (hereafter, referred to as "FD region"). The drain of the reset transistor 13 and the drain of the amplification transistor 14 are connected to a power source voltage line that supplies a power source voltage VDD. The source of the amplification transistor 14 is connected to the drain of the selection transistor 15.

Note that the names of the source and the drain of a transistor may be different in accordance with a conductivity type, a function in interest, or the like of the transistor, and the above-described source and drain may be designated by opposite names. Further, the source and the drain may be referred to collectively as primary electrodes.

The vertical output lines 16 extending in the column direction are arranged on respective lines of the pixel array 10. Each of the vertical output lines 16 is connected to the sources of the selection transistors 15 of the plurality of pixels PX aligned in the column direction, respectively, to form a common signal line to the pixels PX on the same column. Each of the vertical output lines 16 is connected to a current source (not shown). Thereby, the amplification transistor 14 and the current source form a source follower circuit that causes the vertical output line 16 to output a voltage in accordance with the potential of the FD region.

A plurality of control signal lines extending in the row direction are arranged on respective lines of the pixel array 10. Respective control signal lines form common control signal lines to the pixels PXmn aligned in the row direction and are connected to the vertical scanning circuit 40. Respective control signal lines include a reset signal line that transmits a control signal P1, a transfer signal line that transmits a control signal P2, and a row selection signal line that transmits a control signal P3. The vertical scanning circuit 40 outputs the control signal P2 to the gates of the transfer transistors 12 on the corresponding row via the transfer signal line. Further, the vertical scanning circuit 40 outputs the control signal P1 to the gates of the reset transistors 13 on the corresponding row via the reset signal line. Further, the vertical scanning circuit 40 outputs the control signal P3 to the gates of the selection transistors 15 on the corresponding row via the selection signal line.

The readout unit 20 has column readout circuits R provided corresponding to respective columns of the pixel array 10. In FIG. 1, for the purpose of illustration, the column number is denoted as n, and references of Rn are provided to respective column readout circuits. For example, the column readout circuit R located on the first column is denoted as R1.

The circuit configuration of each column readout circuit R will be described. The column readout circuit R has a clamp capacitor 21, a disconnection transistor 22, a reference voltage holding capacitor 23, an operational amplifier 24, a feedback capacitor 25, a clamp transistor 26, a sample-hold transistor (SH transistor) 27, and a sample-hold capacitor (SH capacitor) 28. A plurality of control signal lines and a single reference voltage line extending in the row direction are arranged in each column readout circuit R. Control signals P4, P5, and P6 are supplied to the plurality of control signal lines from a control unit or the like outside the photoelectric conversion device. A reference voltage V1 is supplied to the reference voltage line from the control unit or the like.

The vertical output line 16 on each column is connected to one end of the clamp capacitor 21 of the column readout circuit R on the corresponding column. The other end of the clamp capacitor 21 is connected to the inverting input terminal of the operational amplifier 24, one end of the feedback capacitor 25, and one of the primary electrodes of the clamp transistor 26. The other end of the feedback capacitor 25 and the other of the primary electrodes of the clamp transistor 26 are connected to the output terminal of the operational amplifier 24. The control signal P4 is input to the gate of the clamp transistor 26 via the control signal line.

The non-inverting input terminal of the operational amplifier 24 is connected to one end of the reference voltage holding capacitor 23 and one of the primary electrodes of the disconnection transistor 22. The other end of the reference voltage holding capacitor 23 is grounded. The reference voltage V1 is supplied to the other of the primary electrodes of the disconnection transistor 22 from the reference voltage line. The control signal P5 is input to the gate of the disconnection transistor 22 from the control signal line. Note that the other end of the reference voltage holding capacitor 23 may be connected to any low impedance wiring having a fixed potential, and the potential is not limited to the ground potential. For example, the other end of the reference voltage holding capacitor 23 may be connected to a wiring to which a power source potential is supplied. The reference voltage holding capacitor 23 has a function as a holding unit that holds the reference voltage V1 supplied from the reference voltage line. The operational amplifier 24 has a function as an amplifier unit that amplifies a signal output from the pixel PX based on the reference voltage V1 as a reference held in the reference voltage holding capacitor 23. The disconnection transistor 22 has a function as a switch unit that electrically disconnects the reference voltage holding capacitor 23 from the reference voltage line when the operational amplifier 24 amplifies a signal output from the pixel PX.

Further, one end of the reference voltage holding capacitor 23 of the column readout circuit R1 on the first column is connected via a wiring W to one end of the reference voltage holding capacitor 23 of the adjacent column readout circuit R2 on the second column. Further, one end of the reference voltage holding capacitor 23 of the column readout circuit R2 on the second column is also connected via a wiring W to one end of the reference voltage holding capacitor 23 of the adjacent column readout circuit R3 on the third column. Accordingly, in the example of the present embodiment, one ends of the reference voltage holding capacitors 23 on all the columns are connected through the wiring W that is a different path from the disconnection transistors 22. The reference voltage holding capacitors 23 on adjacent columns through the wiring W can be connected with a low impedance by the connection of the wiring W, which allows the potentials of the connected reference voltage holding capacitors 23 to be close to the same.

Note that it is not essential for one ends of the reference voltage holding capacitors 23 on all the columns to be connected. At least the reference voltage holding capacitor 23 of one column readout circuit (first column readout circuit) and the reference voltage holding capacitor 23 of another column readout circuit (second column readout circuit) that is different from the first column readout circuit are connected to each other.

While the reference voltage holding capacitors 23 on the adjacent columns are connected to each other in FIG. 1, the reference voltage holding capacitors 23 on the distant columns may be connected without the reference voltage holding capacitors 23 on the adjacent columns being connected to each other. Such a configuration example will be described in a third embodiment.

The output terminal of the operational amplifier 24 is further connected to one of the primary electrodes of the SH transistor 27. One end of the SH capacitor 28 is connected to the other of the primary electrodes of the SH transistor 27. The control signal P6 is input to the gate of the SH transistor 27 from the control signal line. The other end of the SH capacitor 28 is grounded. The SH transistor 27 and the SH capacitor 28 form a sample-hold circuit.

The horizontal transfer circuit 30 has horizontal transfer transistors 31, a horizontal transfer line 32, a transistor 33, and a differential amplifier 34 that are arranged corresponding to the column readout circuits R on respective columns. One of the primary electrodes of each horizontal transfer transistor 31 is connected to one end of the SH capacitor 28 of the column readout circuit R on the corresponding column. The other of the primary electrodes of each horizontal transfer transistor 31 is connected to the horizontal transfer line 32. A control signal Hn (n is the column number) output from the horizontal scanning circuit 50 is input to the gate of the horizontal transfer transistor 31 on each column. The horizontal transfer line 32 is connected to the non-inverting input terminal of the differential amplifier 34 and one of the primary electrodes of the transistor 33. The inverting input terminal and the output terminal of the differential amplifier 34 are connected, and the differential amplifier 34 forms a voltage follower that outputs the potential of the horizontal transfer line 32 as an output signal OUT. A reset voltage V2 is input to the other of the primary electrodes of the transistor 33 from the external control unit or the like. A control signal P7 is input to the gate of the transistor 33 from the external control unit or the like. When the transistor 33 is turned on in response to the control signal P7, the horizontal transfer line 32 is reset to the reset voltage V2.

Figure 2:
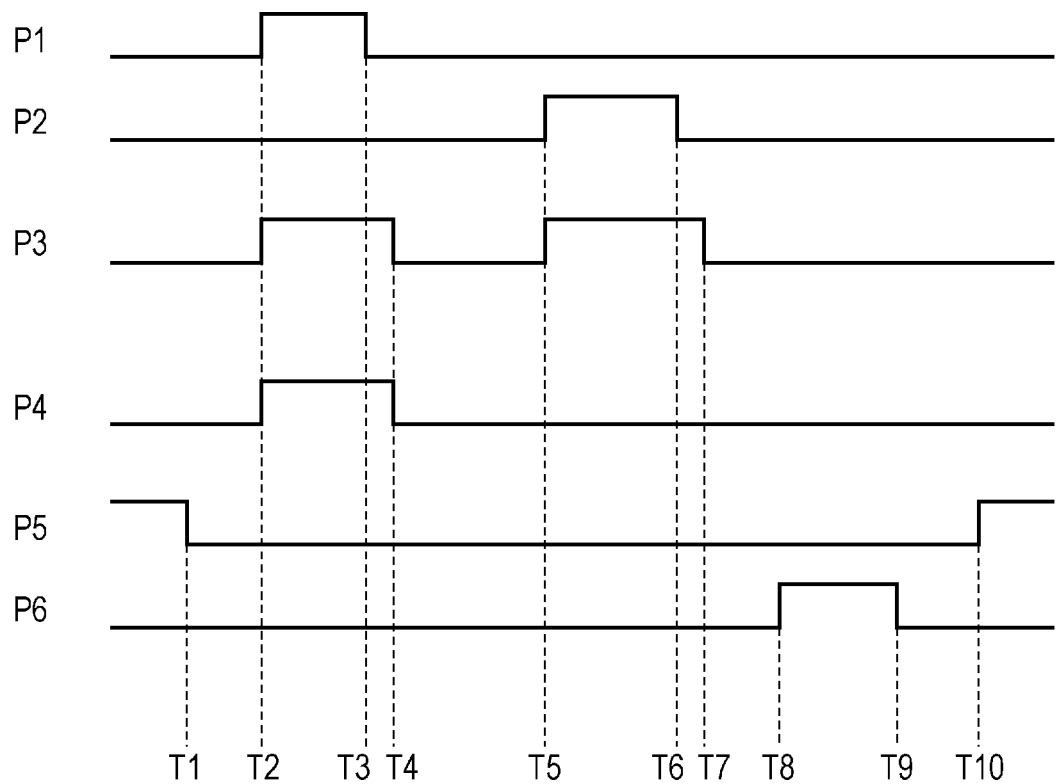
FIG. 2 is a timing chart of the photoelectric conversion device according to the first embodiment of the present invention.

FIG. 2 is a timing chart of the photoelectric conversion device according to the first embodiment. With reference to FIG. 2, a readout operation for one row of the photoelectric conversion device will be described. Immediately before the time T1, the control signal P5 is at a high level, and the disconnection transistor 22 is in an on-state. Thereby, the reference voltage holding capacitor 23 is reset to the reference voltage V1. At the same time, all of the control signals P1, P2, P3, P4, and P6 are at a low level, and all of the reset transistor 13, the transfer transistor 12, the selection transistor 15, the clamp transistor 26, and the SH transistor 27 are in an off-state.

At the time T1, the control signal P5 falls to a low level, and the disconnection transistor 22 is turned off. Thereby, the reference voltage line and the reference voltage holding capacitor 23 are electrically disconnected from each other, and the reference voltage V1 is held in the reference voltage holding capacitor 23.

At the time T2, the control signals P1 and P3 rise to a high level, and the reset transistor 13 and the selection transistor 15 are turned on. Thereby, the FD region is reset by the power source voltage VDD, and a voltage based on a reset state of the FD region is output to the vertical output line 16. Also, at the same time, the control signal P4 rises to a high level, and the clamp transistor 26 is also turned on. Thereby, the inverting input terminal and the output terminal of the operational amplifier 24 are connected to each other to form a voltage follower circuit. Therefore, the node of the inverting input terminal and the output terminal of the operational amplifier 24 are reset with the reference voltage V1.

At the time T3, the control signal P1 falls to a low level, and the reset transistor 13 is turned off. This causes the FD region to enter a floating state. At the time T4, the control signals P3 and P4 fall to a low level, and the selection transistor 15 and the clamp transistor 26 are turned off. At this time, a voltage based on the reset state of the FD region is clamped in the clamp capacitor 21. Further, the output of the operational amplifier 24 is fed back to the inverting input terminal via the feedback capacitor 25. Accordingly, the operational amplifier 24, the clamp capacitor 21, and the feedback capacitor 25 perform an amplifying operation at a gain in accordance with a capacitance ratio of the clamp capacitor 21 to the feedback capacitor 25 based on the reference voltage V1 as a reference.

At the time T5, the control signals P2 and P3 rise to a high level, and the transfer transistor 12 and the selection transistor 15 are turned on. Thereby, charges accumulated in the photoelectric conversion element 11 during a predetermined exposure period are transferred to the FD region. The change in the potential of the FD region at this time causes the voltage occurring on the vertical output line 16 to be a voltage in which a potential change of the FD region based on charges generated by an incident light is superimposed on a voltage in a reset state. Since a voltage based on the reset state of the FD region is clamped in the clamp capacitor 21, the component of the reset state is cancelled, and an amplifying operation is performed on an optical signal voltage corresponding to the incident light in the operational amplifier 24.

At the time T6, the control signal P2 falls to a low level, and the transfer transistor 12 is turned off. Thereby, the charge transfer ends. At the time T7, the control signal P3 falls to a low level, and the selection transistor 15 is turned off. At this time, the electrical connection between the pixel PX and the vertical output line 16 is released.

During a period from the time T8 to the time T9, the control signal P6 is temporarily at a high level, and the SH transistor 27 is in an on-state. Thereby, a signal output from the operational amplifier 24 is held in the SH capacitor 28. At the time 10, the control signal P5 rises to a high level, and the disconnection transistor 22 is turned on. This causes the reference voltage holding capacitor 23 to be again reset with the reference voltage V1.

With the operation described above, signals are read out from the pixels PX on one row and held in the SH capacitor 28. Subsequently, although not illustrated in FIG. 2, control signals H1, H2, H3, . . . , and so on rise sequentially to a high level, and the horizontal transfer transistors 31 are sequentially turned on. Thereby, signals held in the SH capacitors 28 on respective columns are output as the output signal OUT serially outside the photoelectric conversion device.

In the present embodiment, the reference voltage holding capacitor 23 of the column readout circuit R on each column is electrically connected through the wiring W. When there is leakage in the peripheral circuit of the reference voltage holding capacitor 23, the reference voltage V1 held in the reference voltage holding capacitor 23 may vary during the readout period. If readout is performed with the reference voltage V1 being different among a plurality of columns, vertical stripe noise may occur in the acquired image. The output voltage change ΔV from the column readout circuit R due to the leakage is expressed by the following Equation 1.

$$\Delta V = I_L \times T \times G / (k \times C) \qquad \text{Equation 1}$$

Here, the value $I_L$ denotes a leak current. The value T denotes a time period from the time when the reference voltage V1 is held to the time when the readout is completed. In the example illustrated in FIG. 2, the value T corresponds to the time period from the time T1 to the time T9. The value G denotes the gain of the column readout circuit R, which is a value in accordance with the capacitance ratio of the clamp capacitor 21 to the feedback capacitor 25. The value k is the number of electrically connected reference voltage holding capacitors 23. The value C is the capacitance of the reference voltage holding capacitor 23.

Figure 6A:
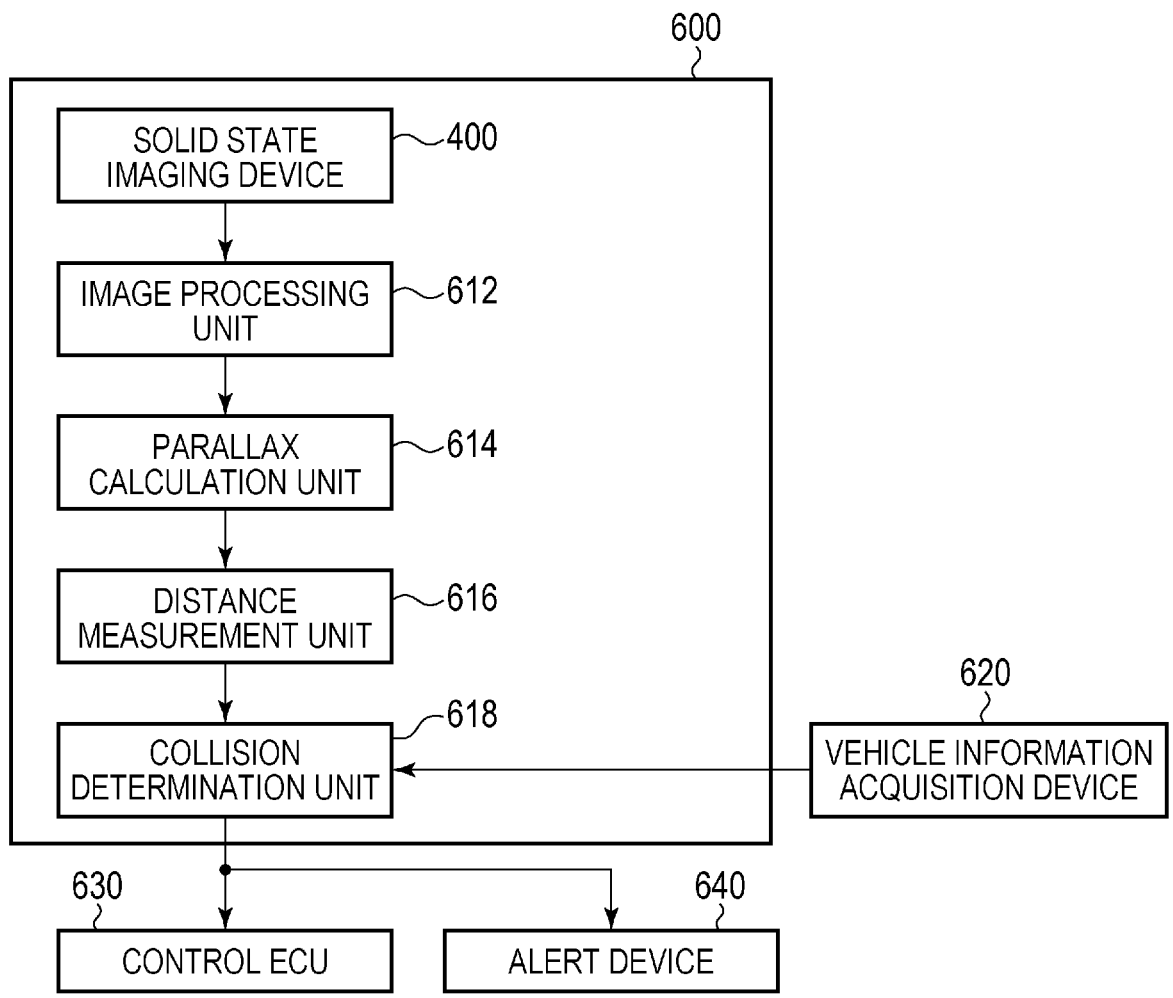
FIG. 6A and FIG. 6B are block diagrams of an imaging system and a mobile apparatus according to a fifth embodiment of the present invention.
Figure 6B:
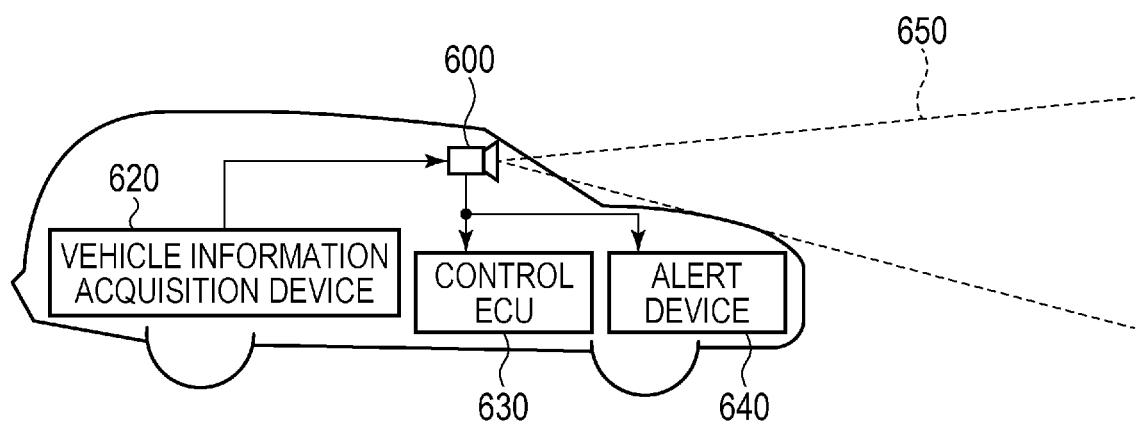

As can be understood from Equation 1, the output voltage change ΔV is inversely proportional to the number of connected reference voltage holding capacitors 23. Therefore, compared to the case where no reference voltage holding capacitor 23 is connected as illustrated in FIGS. 6A and 6B of Japanese Patent Application Laid-Open No. 2008-85994 (k=1 in Equation 1), the output voltage change ΔV is reduced in the configuration of the present embodiment. Thus, according to the present embodiment, a photoelectric conversion device that can reduce vertical stripe noise can be provided. Further, even when there is slight leakage in the peripheral circuit of the reference voltage holding capacitor 23 due to a manufacturing reason, such slight leakage less affects the image quality in the photoelectric conversion device of the present embodiment and is less likely to cause a defect of the photoelectric conversion device of the present embodiment, and therefore a yield rate can be improved.

Note that, according to Equation 1, the larger the number k of connected reference voltage holding capacitors is, the smaller the output voltage change ΔV can be. However, when the levels of signals are significantly different in the horizontal direction (lateral direction in FIG. 1) such as a case where the contrast of an object is great, the consumption current, the operation state, or the like of the operational amplifiers 24 may be significantly different among respective columns. In such a case, the influence due to the difference among columns in the consumption current, the operation state, or the like of the operational amplifiers 24 may cause crosstalk to peripheral pixels PX. Further, the excessively large number k of connected reference voltage holding capacitors 23 may cause a significant influence of crosstalk. In order to sufficiently reduce the influence of crosstalk, it is desirable that the number k of connected reference voltage holding capacitors 23 be less than or equal to (n/100), where the number of columns of the pixel array 10 is n. Further, in order to obtain the advantage of reduction of the noise due to the leakage described above, at least two reference voltage holding capacitors 23 are required to be connected. In taking the above into consideration, it is desirable that the number k of connected reference voltage holding capacitors 23 be greater than or equal to two and less than or equal to (n/100).

While the disconnection transistors 22 are provided to the column readout circuits R, respectively, in a circuit configuration illustrated in FIG. 1, the disconnection transistors 22 on some rows may be omitted as long as the circuit is configured to be able to apply the reference voltage V1 via a wiring from another row. Further, the circuit used for the column readout circuit R is not limited to those use the operational amplifier 24, and a circuit using any amplifier of a different configuration as long as it can be input with the reference voltage. For example, the operational amplifier 24 may be a comparator.

Second Embodiment

Figure 3:
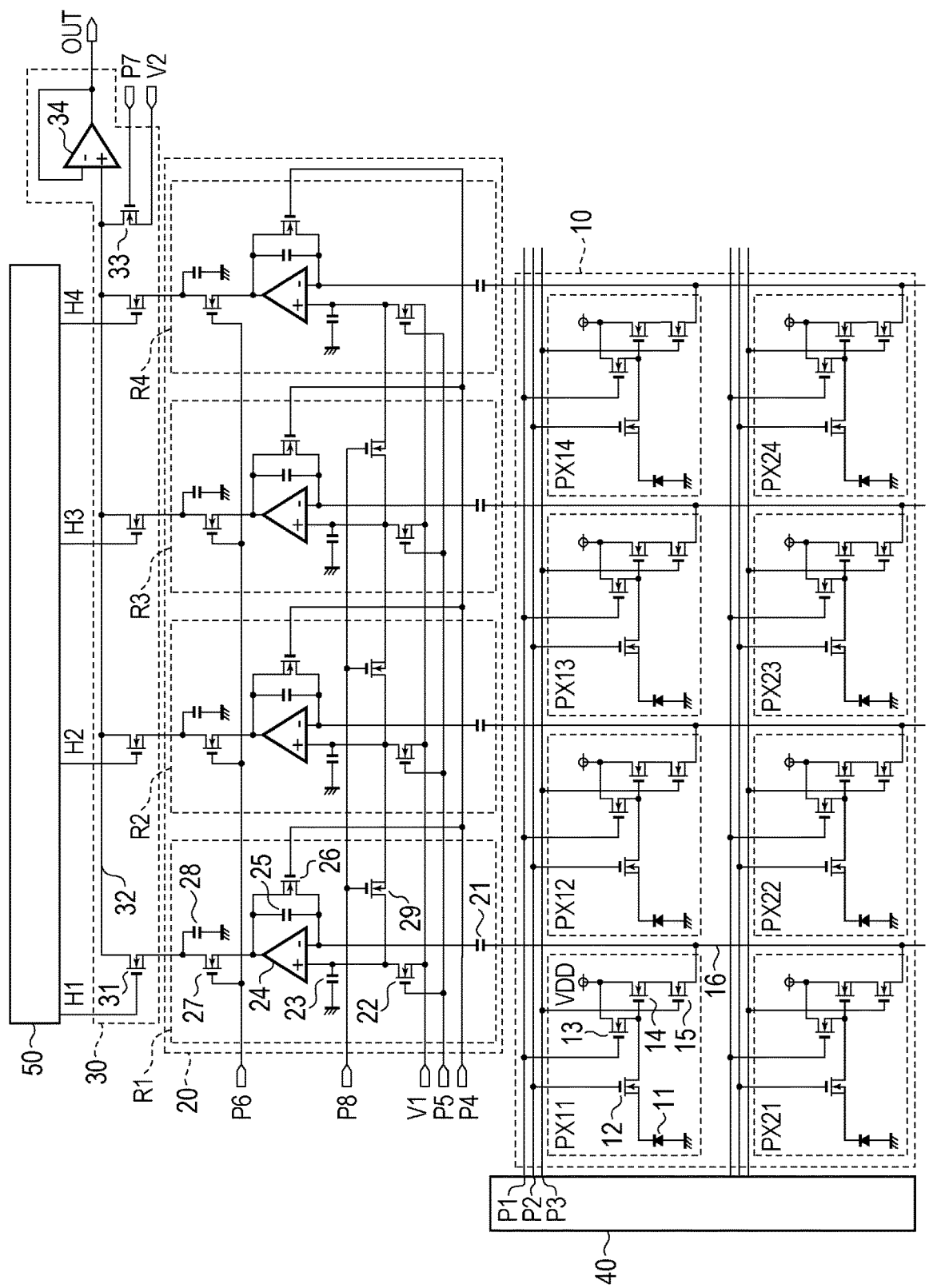
FIG. 3 is a circuit configuration diagram of a photoelectric conversion device according to a second embodiment of the present invention.

Next, a photoelectric conversion device according to a second embodiment of the present invention will be described with reference to FIG. 3. FIG. 3 is a configuration diagram of the photoelectric conversion device according to the second embodiment. The present embodiment is different from the first embodiment in that each of the reference voltage holding capacitors 23 is connected to each of the reference voltage holding capacitors 23 on the adjacent column via a connection transistor 29. Since other features are the same as those of the first embodiment, the description thereof will be omitted.

The column readout circuit R on each column further has the connection transistor 29. One of the primary electrodes (first primary electrode) of the connection transistor 29 of the column readout circuit R1 is connected to the reference voltage holding capacitor 23 of the column readout circuit R1. The other of the primary electrodes (second primary electrode) of the connection transistor 29 of the column readout circuit R1 is connected to the reference voltage holding capacitor 23 of the column readout circuit R2. With respect to other columns, the reference voltage holding units 23 on adjacent columns are connected to each other via the connection transistor 29 in the same manner. A control signal P8 is input to the gates of the connection transistors 29. When the control signal P8 is at a high level, the connection transistors 29 are in an on-state, and the reference voltage holding capacitors 23 on adjacent columns are electrically connected. Further, when the control signal P8 is at a low level, the connection transistors 29 are in an off-state, and the reference voltage holding capacitors 23 on adjacent columns are electrically disconnected from each other.

Whether or not the connection transistor 29 is turned on can be determined based on whether or not there is leakage in the peripheral circuit of the reference voltage holding capacitor 23. The determination as to whether or not there is leakage can be performed based on a result of shipment inspection or an adjustment step of the photoelectric conversion device, for example. When it is determined that there is leakage in the peripheral circuit of the reference voltage holding capacitor 23, noise can be reduced by maintaining the control signal P8 to a high level to electrically connect the reference voltage holding capacitors 23 on adjacent columns to each other. Further, when it is determined that there is no leakage, the influence of crosstalk can be reduced by maintaining the control signal P8 to a low level to electrically disconnect the reference voltage holding capacitors 23 on adjacent columns from each other. Accordingly, in the present embodiment, the connection transistors 29 are provided so as to be able to change whether or not to electrically connect the reference voltage holding capacitors 23 on adjacent columns to each other in accordance with the presence or absence of leakage, and therefore noise can be reduced in a more effective manner.

Third Embodiment

Figure 4:
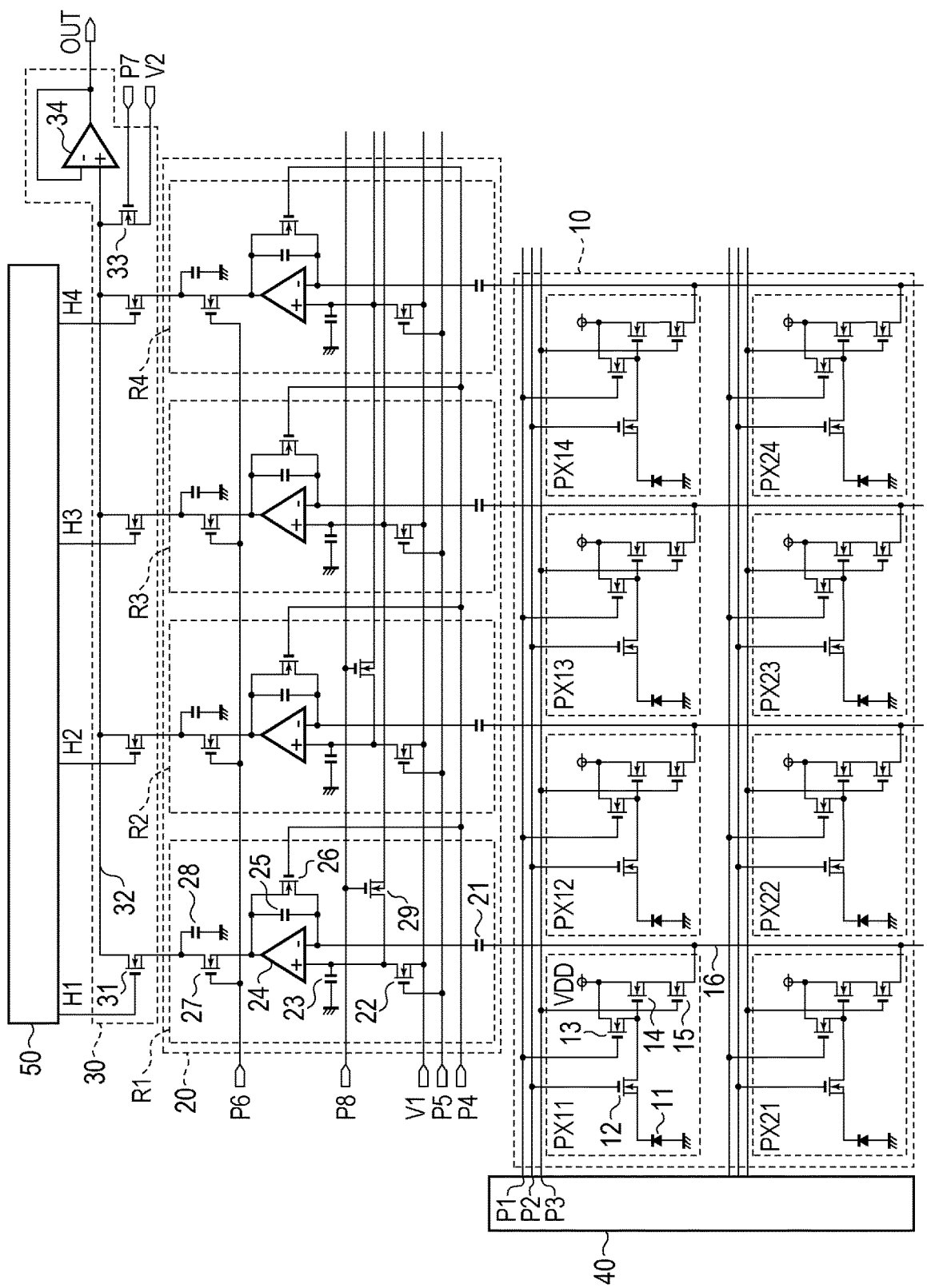
FIG. 4 is a circuit configuration diagram of a photoelectric conversion device according to a third embodiment of the present invention.

Next, a photoelectric conversion device according to a third embodiment of the present invention will be described with reference to FIG. 4. FIG. 4 is a configuration diagram of the photoelectric conversion device according to the third embodiment. The present embodiment is different from the second embodiment in that the reference voltage holding capacitor 23 on one column is not connected to the reference voltage holding capacitor 23 on adjacent column but connected to the reference voltage holding capacitor 23 on the next to adjacent column via the connection transistor 29. Since other features are the same as those of the second embodiment, the description thereof will be omitted.

One of the primary electrodes of the connection transistor 29 of the column readout circuit R1 is connected to the reference voltage holding capacitor 23 of the column readout circuit R1, and the other of the primary electrodes of the connection transistor 29 of the column readout circuit R1 is connected to the reference voltage holding capacitor 23 of the column readout circuit R3. One of the primary electrodes of the connection transistor 29 of the column readout circuit R2 is connected to the reference voltage holding capacitor 23 of the column readout circuit R2, and the other of the primary electrodes of the connection transistor 29 of the column readout circuit R2 is connected to the reference voltage holding capacitor 23 of the column readout circuit R4. Accordingly, the reference voltage holding capacitors 23 on columns which are not adjacent are connected to each other via the connection transistor 29.

As described above, the reference voltage holding capacitors 23 on columns which are not adjacent can be electrically connected to each other, thereby the influence of crosstalk between adjacent columns is reduced, and therefore noise due to the influence of crosstalk is less likely to occur. Note that, while the reference voltage holding capacitors 23 are connected to each other on every other column in FIG. 4, the reference voltage holding capacitors 23 may be connected to each other on every three or more columns.

Fourth Embodiment

Figure 5:
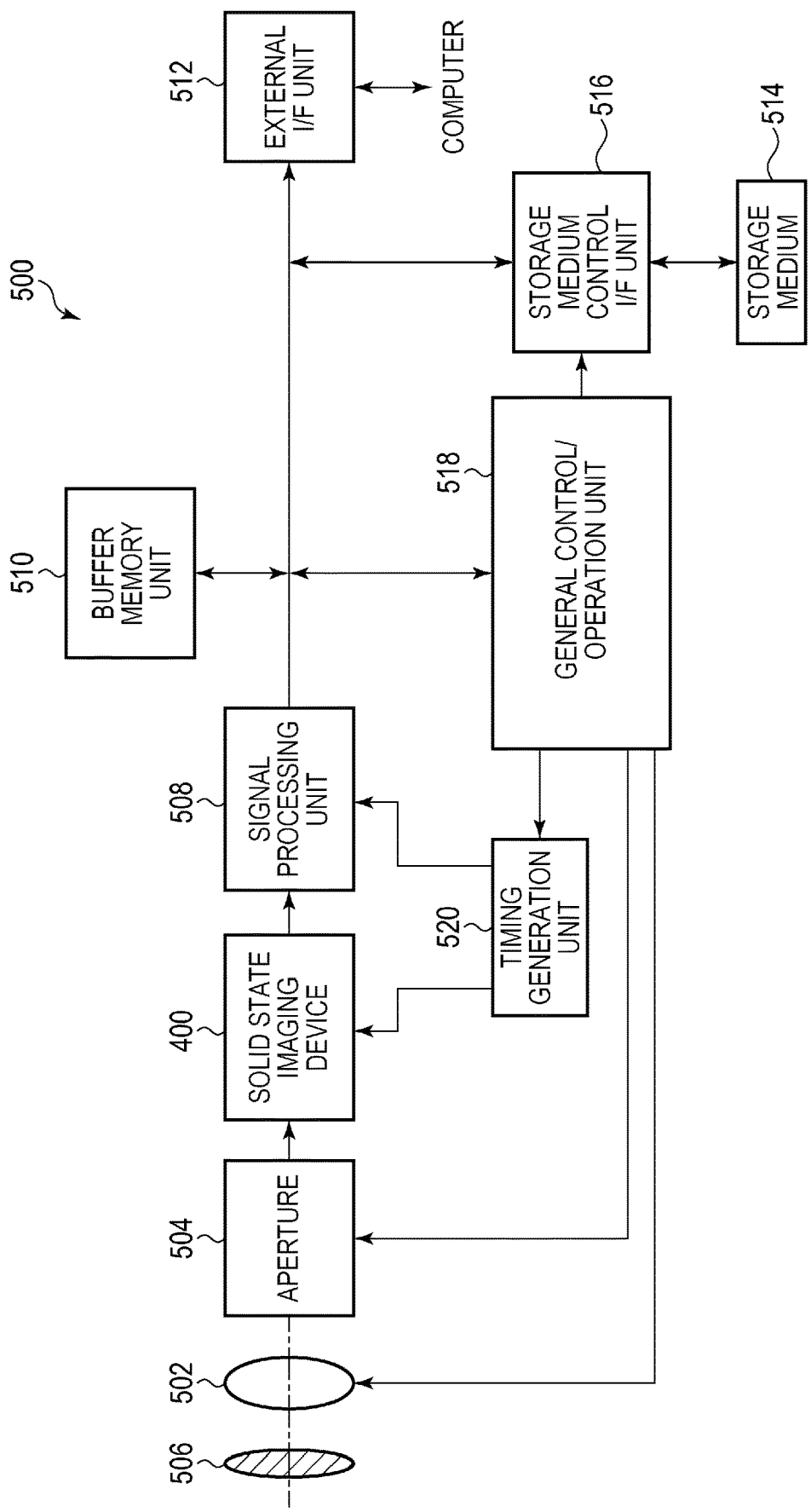
FIG. 5 is a block diagram of an imaging system according to a fourth embodiment of the present invention.

Next, an example of an apparatus to which the solid state imaging device according to any of the above-described embodiments is applied will be described. FIG. 5 is a block diagram illustrating the configuration of an imaging system 500 according to the present embodiment. A solid state imaging device 400 illustrated in FIG. 5 is a solid state imaging device using any of the photoelectric conversion devices described in the above first to third embodiments. The imaging system 500 to which the solid state imaging device 400 can be applied may be, for example, a digital still camera, a digital camcorder, a surveillance camera, or the like. FIG. 5 illustrates an example configuration of a digital still camera to which the solid state imaging device 400 of any of the above-described embodiments is applied.

The imaging system 500 illustrated in FIG. 5 has the solid state imaging device 400, a lens 502 that causes an optical image of an object to be captured onto the solid state imaging device 400, an aperture 504 for changing the amount of a light passing through the lens 502, and a barrier 506 for protecting the lens 502. The lens 502 and the aperture 504 form an optical system that converges a light onto the solid state imaging device 400.

The imaging system 500 further has a signal processing unit 508 that performs processing of an output signal output from the solid state imaging device 400. The signal processing unit 508 performs signal processing operations of performing, if necessary, various correction and compression on an input signal for output. The signal processing unit 508 may have a function of performing Analog-to-Digital (AD) conversion process on an output signal output from the solid state imaging device 400. In this case, the AD converter circuit is not necessarily required to be provided inside the solid state imaging device 400.

The imaging system 500 further has a buffer memory unit 510 for temporarily storing image data and an external interface unit (external I/F unit) 512 for communicating with an external computer or the like. Furthermore, the imaging system 500 has a storage medium 514 such as a semiconductor memory or the like for performing recording or readout of captured data and a storage medium control interface unit (storage medium control I/F unit) 516 for performing recording to or readout from the storage medium 514. Note that the storage medium 514 may be embedded in the imaging system 500 or may be removable.

Furthermore, the imaging system 500 has a general control/operation unit 518 that performs various operation and controls the entire digital still camera and a timing generation unit 520 that outputs various timing signals to the solid state imaging device 400 and the signal processing unit 508. Here, the timing signal or the like may be supplied from the outside, and the imaging system 500 may be any imaging system as long as it has at least the solid state imaging device 400 and the signal processing unit 508 that processes an output signal output from the solid state imaging device 400. The general control/operation unit 518 and the timing generation unit 520 may be configured to perform some or all of the functions related to control of the photoelectric conversion device, such as generation of the control signals, generation of the reference voltage, or the like in the embodiments described above.

The solid state imaging device 400 outputs a signal used for an image to the signal processing unit 508. The signal processing unit 508 performs predetermined signal processing on the signal used for an image output from the solid state imaging device 400 to output image data. Further, the signal processing unit 508 uses the signal used for an image to generate an image.

By forming an imaging system including the solid state imaging device 400 using the photoelectric conversion device according to the first to third embodiments, an imaging system in which noise is further reduced can be realized.

Fifth Embodiment

FIG. 6A and FIG. 6B are diagrams illustrating the configuration of an imaging system 600 and a mobile apparatus according to the present embodiment. FIG. 6A illustrates an example of the imaging system 600 for an on-vehicle camera. The imaging system 600 has the solid state imaging device 400. The solid state imaging device 400 is a solid state imaging devices using the photoelectric conversion device described in any of the above first to third embodiments. The imaging system 600 has an image processing unit 612 that performs image processing on a plurality of image data acquired by the solid state imaging device 400 and a parallax calculation unit 614 that calculates a parallax (a phase difference of parallax images) from the plurality of image data acquired by the imaging system 600. Further, the imaging system 600 has a distance measurement unit 616 that calculates a distance to the object based on the calculated parallax and a collision determination unit 618 that determines whether or not there is a collision possibility based on the calculated distance. Here, the parallax calculation unit 614 and the distance measurement unit 616 are an example of a distance information acquisition unit that acquires distance information on the distance to the object. That is, the distance information is information regarding a parallax, a defocus amount, a distance to an object, or the like. The collision determination unit 618 may use any of the distance information to determine the collision possibility. The distance information acquisition unit may be implemented by dedicatedly designed hardware or may be implemented by a software module. Further, the distance information acquisition unit may be implemented by a field programmable gate array (FPGA), an application specific integrated circuit (ASIC), or the like, or may be implemented by combination thereof.

The imaging system 600 is connected to the vehicle information acquisition device 620 and can acquire vehicle information such as a vehicle speed, a yaw rate, a steering angle, or the like. Further, the imaging system 600 is connected with a control ECU 630, which is a control device that outputs a control signal for causing a vehicle to generate braking force based on a determination result by the collision determination unit 618. That is, the control ECU 630 is an example of a mobile apparatus control unit that controls a mobile apparatus based on distance information. Further, the imaging system 600 is connected with an alert device 640 that issues an alert to the driver based on a determination result by the collision determination unit 618. For example, when the collision probability is high as the determination result of the collision determination unit 618, the control ECU 630 performs vehicle control to avoid a collision or reduce damage by applying a brake, pushing back an accelerator, suppressing engine power, or the like. The alert device 640 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 600. FIG. 6B illustrates the imaging system 600 in a case of capturing a front area of a vehicle (a capturing area 650). The vehicle information acquisition device 620 transmits instructions to operate the imaging system 600 and perform capturing of an image. The imaging system 600 of the present embodiment including the solid state imaging device 400 using any of the photoelectric conversion devices according to the first to third embodiments can improve the ranging accuracy.

Although the example of control for avoiding a collision to another vehicle has been illustrated in the above description, the embodiment is applicable to automatic driving control for following another vehicle, automatic driving control for not going out of a traffic lane, or the like. Furthermore, the imaging system is not limited to a vehicle such as the subject vehicle, and can be applied to a mobile apparatus (moving apparatus) such as a ship, an airplane, or an industrial robot, for example. In addition, the imaging system can be widely applied to a device which utilizes object recognition, such as an intelligent transportation system (ITS), without being limited to mobile apparatuses.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, it should be appreciated that an embodiment in which a part of the configuration of any of the embodiments is added to another embodiment or an embodiment in which a part of the configuration of any of the embodiments is replaced with a part of the configuration of another embodiment is the embodiment to which the present invention can be applied.

This application claims the benefit of Japanese Patent Application No. 2017-085340, filed Apr. 24, 2017, which is hereby incorporated by reference herein in its entirety.

What is claimed is:

1. A photoelectric conversion device comprising:
   a pixel array including a plurality of pixels which are arranged to form a plurality of columns; and
   a readout unit including a plurality of column readout circuits that are provided corresponding to the plurality of columns of the pixel array, each of the plurality of column readout circuits being configured to read out signals from the pixels in a corresponding column,
   wherein the plurality of column readout circuits includes a first column readout circuit for a first column and a second column readout circuit different from the first column readout circuit for a second column,
   wherein the first column readout circuit includes:
   a first holding unit configured to hold a reference voltage supplied from a reference voltage line;
   a first amplifier unit configured to amplify a signal output from one of the plurality of pixels of the first column based on the reference voltage held in the first holding unit; and
   a first switch unit configured to electrically disconnect the reference voltage line from the first holding unit when the first amplifier unit amplifies the signal output from the one of the plurality of pixels, and
   wherein the second column readout circuit includes:
   a second holding unit configured to hold the reference voltage supplied from the reference voltage line;
   a second amplifier unit configured to amplify a signal output from one of the plurality of pixels of the second column based on the reference voltage held in the second holding unit; and
   a second switch unit configured to electrically disconnect the reference voltage line from the second holding unit when the second amplifier unit amplifies the signal output from the one of the plurality of pixels, and
   wherein the first holding unit and the second holding unit are electrically connected to each other by a path other than the first switch unit and the second switch unit.

2. The photoelectric conversion device according to claim 1, wherein the first holding unit and the second holding unit are connected to each other via a wiring.

3. The photoelectric conversion device according to claim 1 further comprising a connection transistor having a first primary electrode and a second primary electrode,
   wherein the first holding unit is connected to the first primary electrode of the connection transistor, and the second holding unit is connected to the second primary electrode of the connection transistor, and
   wherein, when the connection transistor is turned on, the first holding unit and the second holding unit are electrically connected to each other.

4. The photoelectric conversion device according to claim 1, wherein a column corresponding to the first column readout circuit and a column corresponding to the second column readout circuit are adjacent to each other.

5. The photoelectric conversion device according to claim 1, wherein the first column corresponding to the first column readout circuit and the second column corresponding to the second column readout circuit are not adjacent to each other.

6. The photoelectric conversion device according to claim 1, wherein the holding units of respective column readout circuits which are connected to the first holding unit are greater than or equal to two and less than or equal to n/100 including the first holding unit and the second holding unit, where the number of columns of the pixel arrays is n.

7. An imaging system comprising:
   the photoelectric conversion device according to claim 1; and
   a signal processing unit configured to process a signal output from the photoelectric conversion device.

8. A mobile apparatus comprising:
   the photoelectric conversion device according to claim 1;
   a distance information acquisition unit configured to acquire distance information on a distance to an object, from a parallax image based on signals from the photoelectric conversion device; and
   a mobile apparatus control unit configured to control the mobile apparatus based on the distance information.

* * * * *